United States Patent
Neagu et al.

(10) Patent No.: US 12,437,192 B1
(45) Date of Patent: Oct. 7, 2025

(54) ARTIFICIAL INTELLIGENCE SYSTEM FOR ANOMALOUS ACTIVITY DETECTION USING STATIC AND DYNAMIC COVARIATES

(71) Applicant: Amazon Technologies, Inc., Seattle, WA (US)

(72) Inventors: Matei Stefan Neagu, Iasi (RO); Daniel Voinea, Iasi (RO); Constantin Haralambie Ionescu, Bucharest (RO); Cristina Simionescu, Zalau (RO)

(73) Assignee: Amazon Technologies, Inc., Seattle, WA (US)

( * ) Notice: Subject to any disclaimer, the term of this patent is extended or adjusted under 35 U.S.C. 154(b) by 1198 days.

(21) Appl. No.: 17/114,107

(22) Filed: Dec. 7, 2020

(51) Int. Cl.
*G06N 3/08* (2023.01)
*G06F 9/54* (2006.01)
*G06F 11/34* (2006.01)
*G06F 18/214* (2023.01)
*G06F 21/55* (2013.01)
*G06N 3/044* (2023.01)

(52) U.S. Cl.
CPC ............ *G06N 3/08* (2013.01); *G06F 9/542* (2013.01); *G06F 11/3438* (2013.01); *G06F 18/214* (2023.01); *G06F 21/552* (2013.01); *G06N 3/044* (2023.01)

(58) Field of Classification Search
CPC ...... G06N 3/08; G06N 30/0985; G06N 3/044; G06N 3/0442; G06F 18/214; G06F 9/542; G06F 11/3438; G06F 21/552; H04L 67/535

USPC ........................................................... 726/22
See application file for complete search history.

(56) References Cited

U.S. PATENT DOCUMENTS

| | | | |
|---|---|---|---|
| 9,135,559 B1* | 9/2015 | Chan .................... | G06F 16/2455 |
| 11,232,465 B2* | 1/2022 | Orr ........................ | G06N 7/01 |
| 2016/0019460 A1* | 1/2016 | Li ...................... | G06F 16/24578 719/318 |
| 2017/0118092 A1* | 4/2017 | Dixon .................. | H04L 41/0894 |
| 2020/0084280 A1* | 3/2020 | Malhotra ................ | G06F 9/451 |
| 2020/0259852 A1* | 8/2020 | Wolff ...................... | H04L 67/10 |
| 2022/0019935 A1* | 1/2022 | Ghatage .............. | G06F 11/3065 |

OTHER PUBLICATIONS

Gediminas Adomavicius & Alexander Tuzhilin, "Context-Aware Recommender Systems," Springer Nature Link, 2010, pp. 217-253.
Lei Jimmy Ba, Rich Caruana, "Do Deep Nets Really Need to be Deep?," Part of Advances in Neural Information Processing Systems 27 (NIPS 2014), pp. 1-9.

(Continued)

*Primary Examiner* — Kaylee J Huang
(74) *Attorney, Agent, or Firm* — Alexander A. Knapp; Kowert, Hood, Munyon, Rankin & Goetzel, P.C.

(57) ABSTRACT

A training data set which includes event sequences representing actions of respective users of an application, properties of the users, and dynamic attributes associated with events such as the elapsed time between successive events, is prepared. A machine learning model which provides probabilistic predictions of next events of input event sequences is trained using the training data set. A trained version of the model is stored.

20 Claims, 9 Drawing Sheets

(56) References Cited

OTHER PUBLICATIONS

Kai-Wen Cheng, et al., "Video Anomaly Detection and Localization Using Hierarchical Feature Representation and Gaussian Process Regression," Proceedings of the IEEE Conference on Computer Vision and Pattern Recognition (CVPR), 2015, pp. 2909-2917.
Min Du, et al., "DeepLog: Anomaly Detection and Diagnosis from System Logs through Deep Learning," CCS '17: Proceedings of the 2017 ACM SIGSAC Conference on Computer and Communications Security, pp. 1285-1298, https://doi.org/10.1145/3133956.313401.
Davyd Gromenko, "Corporate Security in the EU and GDPR: Data breaches in British Airways and The Marriott International," Nov. 2019, DOI:10.13140/RG.2.2.34290.66240, pages.
David J. Hand, "Data Mining: Statistics and More?," The American Statistician, May 1998, vol. 52, No. 2, pp. 112-118.
Richa Handa, A.K. Shrivas, H.S. Hota, "Financial Time Series Forecasting using Back Propagation Neural Network and Deep Learning Architecture," International Journal of Recent Technology and Engineering (IJRTE), ISSN: 2277-3878 (Online), vol. 8, Issue-1, May 2019.
Sepp Hochreiter, "The Vanishing Gradient Problem During Learning Recurrent Neural Nets and Problem Solutions," International Journal of Uncertainty, Fuzziness and Knowledge-Based Systems, vol. 06, No. 02, pp. 107-116 (1998).
Bing Jiang, et al., "Deep Bottleneck Features for Spoken Language Identification," PLOS ONE, Open Access, Published: Jul. 1, 2014, pp. 1-11, https://doi.org/10.1371/journal.pone.0100795.
Kevin S. Killourhy, et al., "Comparing anomaly-detection algorithms for keystroke dynamics," IEEE, 2009, pp. 125-134.
Paul Resick, et al., "Recommender Systems," arch 1997/vol. 40, No. 3 Communications of the ACM, pp. 56-58.
Usman Asghar Sandhu, et al. "A Survey of Intrusion Detection & Prevention Techniques," 2011 International Conference on Information Communication and Management, IPCSIT vol. 16 (2011) © (2011) IACSIT Press, Singapore, pp. 66-71.
S. T. Sarasamma, Q. A. Zhu and J. Huff, "Hierarchical Kohonenen net for anomaly detection in network security," in IEEE Transactions on Systems, Man, and Cybernetics, Part B (Cybernetics), vol. 35, No. 2, pp. 302-312, Apr. 2005, doi: 10.1109/TSMCB.2005.843274.
Dominique T. Shipmon, et al., "Time Series Anomaly Detection; Detection of anomalous drops with limited features and sparse examples in noisy highly periodic data," Xiv:1708.03665v1, 2017, pp. 1-9.
Keng L. Siau, et al., "Impact of Artificial Intelligence, Robotics, and Machine Learning on Sales and Marketing," AIS Electronic Library (AISeL), MWAIS 2017 Proceedings, pp. 1-2.
M.T. Siponen, "Secure-system design methods: evolution and future directions," IT Professional Magazine; Washington vol. 8, Iss. 3, (May/Jun. 2006): pp. 40-44. DOI:10.1109/MITP.2006.73.
Sundsøy, P., Bjelland, J., Iqbal, A.M., Pentland, A.., de Montjoye, YA. (2014). Big Data-Driven Marketing: How Machine Learning Outperforms Marketers' Gut-Feeling. In: Kennedy, W.G., Agarwal, N., Yang, S.J. (eds) Social Computing, Behavioral-Cultural Modeling and Prediction. SBP 2014. Lecture Notes in Computer Science, vol. 8393. Springer, Cham. https://doi.org/10.1007/978-3-319-05579-4_45, pp. 367-374.
Lawrence . Trautman and Peter C. Ormerod, Corporate Directors' and Officers' Cybersecurity Standard of Care: the Yahoo Data Breach, 66 Am. U. L. Rev. 1231 (2016-2017), pp. 1231-1291.
J. Yang, C. Zhou, S. Yang, H. Xu and B. Hu, "Anomaly Detection Based on Zone Partition for Security Protection of Industrial Cyber-Physical Systems," in IEEE Transactions on Industrial Electronics, vol. 65, No. 5, pp. 4257-4267, May 2018, doi: 10.1109/TIE.2017.2772190.
John Yeo, Trustwave, "Using penetration testing to enhance your company's security," Computer Fraud & Security vol. 2013, Issue 4, Apr. 2013, pp. 17-20.

* cited by examiner

ARTIFICIAL INTELLIGENCE SYSTEM FOR ANOMALOUS ACTIVITY DETECTION USING STATIC AND DYNAMIC COVARIATES

BACKGROUND

Ensuring the trustworthiness and security of the data and devices being used to run computer-based applications has become a growing concern in recent years, as the sophistication of attack mechanisms has increased. Hardware and software engineers keep enhancing the built-in safety mechanisms of computer systems, while attackers keep discovering new avenues for penetrating the defenses designed by the engineers. Further complicating the security problem, more and more computer-based applications are being run on network-accessible resources that can be shared among multiple users, which can potentially provide additional opportunities for various types of security breaches.

Many companies and other organizations operate computer networks that interconnect numerous computing systems to support their operations, such as with the computing systems being located in multiple distinct geographical locations (e.g., connected via one or more intermediate networks). Data centers housing significant numbers of interconnected computing systems have become commonplace, including public data centers that are operated by entities as businesses to provide computing resources to customers. Some public data center operators provide network access, power, and secure installation facilities for hardware owned by various customers, while other public data center operators provide "full service" facilities that also include hardware resources made available for use by multiple customers.

Such data centers are often used to store data that may be accessed directly or indirectly on behalf of multiple users from around the world at very high aggregate rates. Discovering whether activities performed on behalf of the users constitute legitimate or malicious behavior, and taking actions to prevent or limit the loss of important data quickly, remain non-trivia technical problems.

Figure 1:
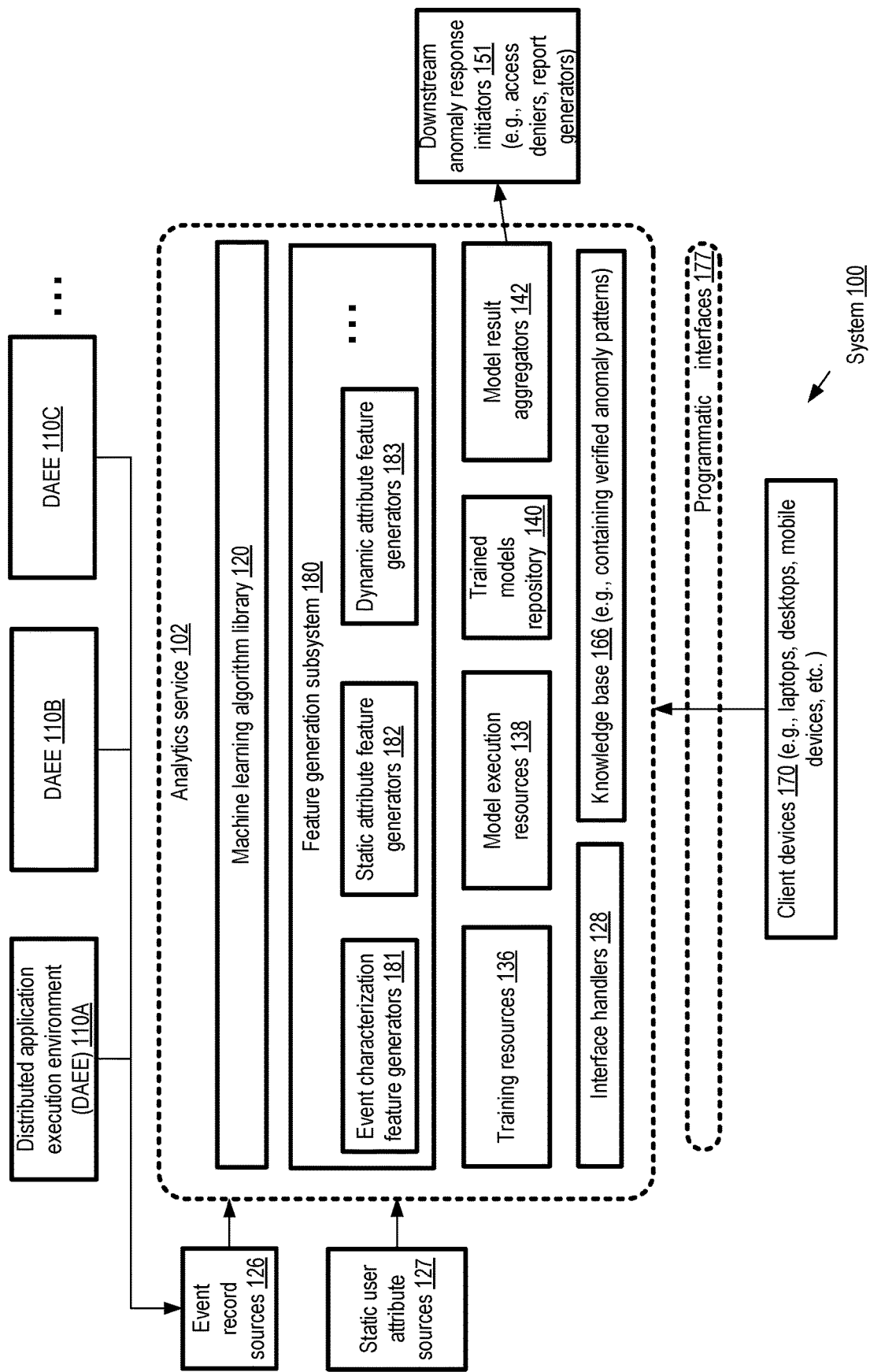
FIG. 1 illustrates an example system environment in which machine learning models using a combination of static and dynamic covariates associated with event records may be used to detect anomalous activities with respect to complex applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for detecting anomalous patterns of behavior, such as potential data exfiltration attempts, by users of complex applications using machine learning models whose input includes representations of events and associated static and dynamic covariates. Because of the small fraction of anomalous behaviors relative to the overall set of user actions for most applications, obtaining sufficient labeled data to train a supervised model for anomaly detection is often difficult. The proposed approach does not require input data to be labeled as anomalous or non-anomalous to train the machine learning models; instead, it takes information about sequencing of events on a per-user basis into consideration, thereby capturing cross-event interactions that are otherwise hard to capture. In addition to information about the events themselves, the proposed approach also takes temporal information, such as the inter-event intervals, resource usage metrics (such as how frequently a given data set is accessed by a given user) and other dynamic covariates, and static information about the users (e.g., the roles or responsibilities of different users, which can impact the manner in which the users interact with application components) into account when generating probabilistic predictions of expected user behaviors. The actual events which occur are then compared with their predicated probabilities to obtain anomaly scores, and the anomaly scores are aggregated in various ways to determine whether (a) a pattern of user behavior actually constitutes an anomaly and (b) if so, whether the anomalous behavior is potentially damaging or malicious, and thus requires mitigation or reporting actions to be undertaken. If a determination is made that such an anomaly response action is to be performed, the required action (such as blocking a given user from accessing application resources further) is triggered automatically.

As one skilled in the art will appreciate in light of this disclosure, certain embodiments may be capable of achieving various advantages, including some or all of the following: (a) substantially reducing the computing, memory, storage, networking and other resources utilized to quickly identify instances of actionable anomalous user behavior for complex applications, using contextual analysis of user behavior, (b) eliminating the need for manual labeling of examples for training for anomaly detection machine learning models, thereby reducing the overall time and resources needed to train such models and/or (c) improving the user experience of system and application administrators, e.g., by reducing the number of false positive anomalies identified, and reducing the number of different logs and other data sources which have to be examined to try to detect and respond to undesired user behaviors.

According to some embodiments, a system may comprise one or more computing devices, e.g., of an analytics service of a provider network or cloud computing environment. The computing devices may include instructions that upon execution on or across the one or more computing devices cause the one or more computing devices to identify sources of event records of an application execution environment with respect to which detection of anomalous user behavior are to be performed, e.g., using an analytics service of a provider network or cloud computing environment. The application execution environment may comprise, for example, various computing, storage and/or networking devices distributed across various other services and data centers of a provider network, and/or located at premises of customers of the provider network. The event record sources may include, for example, respective logs generated by different subcomponents of the applications run at the execution environment in some embodiments. An individual event records may provide an indication of, for example, (a) a user whose action resulted in generation of the event record, (b) an event identifier, and/or (c) a timestamp indicating when the action or event occurred in some embodiments.

From the sources of the event records, respective event sequences corresponding to individual users of the application execution environment may be extracted in various embodiments. Corresponding to individual users whose event sequences have been extracted, a respective set of static user attributes, such as information about the role of the user with respect to the application execution environment may be determined in at least some embodiments. Such roles may include, for example, an end user of an application, an administrator of the application, a security analyst responsible for identifying and responding to malicious user actions, and so on.

A training data set for a machine learning model which can generate probabilistic predictions of future actions by individual users may be prepared in various embodiments. Such a training data set may comprise, for example, (a) the extracted event sequences, (b) respective sets of static user attributes and (c) one or more dynamic attributes associated with individual events of the event sequences. A number of types of dynamic attributes may be generated in some embodiments with respect to an event, including for example an elapsed time between the event and a preceding event, attributes indicating how frequently (or the number of times within a given time period such as an hour) a resource such as a data store indicated in the event has been accessed by the user, other dynamic resource usage measures, the type of device (e.g., laptop, phone, etc.) utilized by the user, the network address of a device utilized by the user, and so on. The attributes may also be referred to as properties or covariates; as such, a combination of static and dynamic covariates may be used as inputs for the model. Using the training data set, one or more machine learning models may be trained to provide, as output, at least a probabilistic prediction of a next event of an input event sequence corresponding to an individual user. In at least some embodiments, the predictions may comprise probability distributions for different categories of "next" user actions or events, such as logging in to an application or application component, performing a read operation, performing a write operation, downloading or uploading data, logging out, etc. Trained versions of the one or more models may be stored.

After the model(s) have been trained, they may be used to generate anomaly scores for various user actions (actions which were not included in the training data). Any of several types of aggregation algorithms may be applied to the anomaly scores to determine whether an anomaly response is required in different embodiments. For example, in some cases, the number of actions whose anomaly scores exceeded a first threshold during a particular time interval (such as ten minutes or an hour) or a user interaction session may be computed, and a determination may be made that a response action is required only if this number exceeds a second threshold. User session boundaries or definitions may be obtained or learned at the analytics service at which the anomaly analysis is being performed in some embodiments—e.g., a user session for a particular category of user may be defined as a time interval during which the maximum time between two actions is smaller than M minutes. In some cases, the aggregation algorithm may take the number of consecutive actions of an event sequence being analyzed whose anomaly score exceeds a threshold—e.g., a response action may be undertaken if more than K successive actions by a user all have anomaly scores greater than A1. If a response action (such as barring further access to a resource by a user) is needed, the action may be automatically initiated in at least some embodiments.

Any of a variety of machine learning models may be used for generating the probabilistic predictions in different embodiments. In some embodiments, neural network models which include long short-term memory units (LSTMs) may be employed, for example. Other types of neural network models, including models which use GRUs (Gated Recurrent Units), convolutional neural network (CNN) layers and the like may be used in different embodiments. In various embodiments, the model(s) may include embedding layers (in which vector representations of the input covariates are learned), dense layers, and so on. In some embodiments, models which do not utilize neural networks may be employed.

Several different static user attributes may be obtained and used as input for the machine learning models in some embodiments. In addition to the organizational roles mentioned above, such static attributes may include, for example, location information of the users (e.g., geographical regions from which the users interact with the application execution environment), or a user category to which a user has been assigned with respect to the application (such as a frequent user, an occasional user, etc.)

In at least one embodiment, the individual actions represented in the event sequences may be classified into logically related groups or categories, such as reads, writes, downloads, uploads, logins, logouts etc. A dynamic covariate representing the action category of the event record may also be used as input to the machine learning model(s) in some such embodiments. In one embodiment, in addition to predicting the probabilities of different next events of an event sequence, the machine learning model(s) may also provide probabilistic predictions of the timings of the next event (e.g., what is the respective probability that the next event occurs after S1 seconds vs. after S2 seconds, etc.).

According to some embodiments, recommendations for improving the data quality of record groups provided as input to the candidate models (and/or the meta-model itself) may be provided by an analytics service, e.g., based at least in part on statistical analysis of the results obtained from the meta-model. For example, analysis of the results of the meta-model may indicate that, regardless of the kind of candidate machine learning model used, the results for record groups that have inaccurate or incomplete values of some combination of attributes are poor. As such, the recommendation or improving the data quality may comprise suggestions to ensure that more accurate and complete values be obtained for the identified combination of attributes. In various embodiments, recommendations for changes (e.g., hyper-parameter changes) which could lead to improving the quality of results of the candidate models may be provided by an analytics service after an analysis of the relative performance of the candidates models and the hyper-parameter used for the tasks. In one embodiment, for example, analysis of the meta-model results may indicate that neural network-based models with a first range of convolution filter sizes (or a certain number of hidden layers) tend to perform better for some types of common record group attribute value distributions than others, so recommendations for candidate model changes may include modifying convolution filter sizes or the number of hidden layers.

In some embodiments, after actionable anomalous patterns of user behavior have been identified using the machine learning models and aggregation techniques, representations of the actionable anomalous user action patterns may be stored, e.g., at a knowledge base maintained at an analytics service. In some cases, the patterns identified may be verified as being actionable by a set of auditors, such as security experts and the like, before their representations are stored in the knowledge base. The stored patterns may later be used to identify additional actionable anomalous user action patterns, e.g., using similarity analysis algorithms and the like.

According to some embodiments, as suggested earlier, anomaly analysis of the kind introduced above may be performed at a network-accessible analytics service of a provider network, e.g., in response to one or more programmatic requests directed to the analytics service by its clients. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which machine learning models using a combination of static and dynamic covariates associated with event records may be used to detect anomalous activities with respect to complex applications, according to at least some embodiments. As shown, system 100 of FIG. 1 comprises resources and artifacts of an analytics service 102, including a machine learning algorithm library 120, a feature generation subsystem 180, training resources 136, model execution resources 138, trained models repository 140, model result aggregators 142, interface handlers 128 and a knowledge base 166. Each of the different subcomponents of analytics service 102 may comprise some combination of hardware and software of one or more computing devices in various embodiments.

The analytics service 102 may implement a set of programmatic interfaces 177 in the depicted embodiment, such as a web-based console, command-line tools, application programming interfaces (APIs), graphical user interfaces and the like. Clients of analytics service 102 may submit various types of requests, command or messages pertaining to anomaly analysis via interfaces 177 in the depicted embodiment from a variety of client devices 170, such as laptops, desktops, mobile devices and the like, and receive corresponding responses. The requests, commands or messages may be received and processed initially by a set of interface handlers 128, which may then transmit internal versions of the received messages to other subcomponents of the analytics service to perform the required work and provide results if needed.

In at least some embodiments, a client may use programmatic interfaces 177 to provide an indication of a distributed application execution environment (DAEE) 110, such as DAEE 110A, 110B or 110C, at which anomaly analysis of user behavior is to be performed. Each of the DAEEs 110 may comprise some number of subcomponents, which may be distributed across different data centers or premises. In embodiments in which the analytics service 102 is implemented at a provider network or cloud computing environment, some portions or all of a given DAEE may utilize other services of the provider network, such as a virtualized computing service, a database service, a storage service and the like. The information provided about a DAEE by a client may include various event record sources 126 (e.g., log files or logging subsystems) from which event records indicting user actions with respect to the DAEE can be obtained, credentials or permissions needed to access the event record sources 126, and so on. A given event record may identify a user, an action taken or initiated by the user, and/or a timestamp in some embodiments. In at least some embodiments, the client may also provide information about (and/or credentials usable to access) one or more static user attribute sources 127, from which metadata about different users of the DAEEs 110 (e.g., their job roles/responsibilities, locations, etc.) can be obtained by the analytics service 102.

In various embodiments, a model training coordinator implemented at one or more computing devices of the analytics service (e.g., part of training resources 136) may extract respective event sequences corresponding to individual users of the DAEEs. The model training coordinator may determine, corresponding to individual users whose event sequences have been extracted from the event record sources 126, a respective set of static user attributes in some embodiments. A training data set for a machine learning model implementing an anomaly detection algorithm of library 120 may be prepared in the depicted embodiment, comprising representations of features generated at feature generation subsystem 180. The features incorporated in the training data set may include, for example, representations of event sequences (produced by event characterization feature generators 181), static features or attributes (produced by static attribute feature generators), and one or more dynamic features or attributes associated with individual events of the event sequences (produced by dynamic attribute feature generators 183) in some embodiments. A dynamic attribute pertaining to a particular event of a particular event sequence may, for example, indicate an elapsed time between the particular event and a preceding event of the particular event sequence. Other dynamic attributes/features for an event may represent resource usage information—e.g., how many times in the last hour the user has accessed the same database as the database accessed in the event, an action category of the event (e.g., read/write/download/upload), etc. In some embodiments, dynamic attributes could include an indication of a type of device utilized by the user to perform the action represented in an event record, and/or a network address (or address range) of a device utilized to perform the action.

Using the training data set, one or more machine learning models may be trained (e.g., at training resources 136) to provide output comprising at least a probabilistic prediction of a next event of an input event sequence corresponding to an individual user of a DAEE in the depicted embodiment. Any of a variety of algorithms from machine learning algorithm library 120 may be used for the models in different embodiment, such as LSTM-based algorithms, GRU-based algorithms, convolutional neural network (CNN) based algorithms and the like. Trained versions of the models may be stored at trained models repository 140 in the depicted embodiment.

After the model(s) have been trained, they may be executed using model execution resources 138 (e.g., a set of computing devices) to predict the probabilities of future events corresponding to individual users' event sequences in the depicted embodiment. Anomaly scores for individual events (or sequences of events) may be computed in various embodiments using the model output, e.g., by comparing the predicted probabilities of different events initiated by a given user with the actual events initiated by the user. In at least some embodiments, the model output may itself include an anomaly score for an observed event in view of an input sequence of prior events initiated by the same user.

One or more model result aggregators 142, comprising one or more computing devices, may analyze the anomaly scores produced with the help of the models for some collection of actions of a user, and make a determination as to (a) whether the collection of actions is in fact an anomaly and (b) whether anomaly response actions should be initiated in the depicted embodiment. In effect, while the machine learning models may generate anomaly scores at a per-event (or at a per-short-event-sequence) level, the model result aggregators 142 may take a longer-range view, combining various anomaly scores and/or other information, before making a decision as to whether some action is required.

In scenarios in which a decision is made that an action is required, one or more downstream anomaly response initiators 151 may be notified, and the required action may be initiated automatically in at least some embodiments. The type of action to be undertaken may be specified by the client on whose behalf the anomaly analysis is being performed in some embodiments—e.g., further access to one or more resources or DAEEs may be denied to a user whose behavior has been deemed undesirable, reports indicating the details of the malicious/undesired activity may be generated and distributed, a root cause analysis workflow may be initiated, and so on.

In some embodiments, the decisions taken by model result aggregators 142 may be subjected to further auditing or scrutiny, e.g., by a set of security experts or auditors. The results of such scrutiny, comprising for example verified anomaly patterns, may be stored in a knowledge base 166 of the analytics service. The stored patterns may then be used to examine or re-examine event record sequences to detect additional anomalous patterns in at least some embodiments.

Example Temporal Distributions of Events

Figure 2:
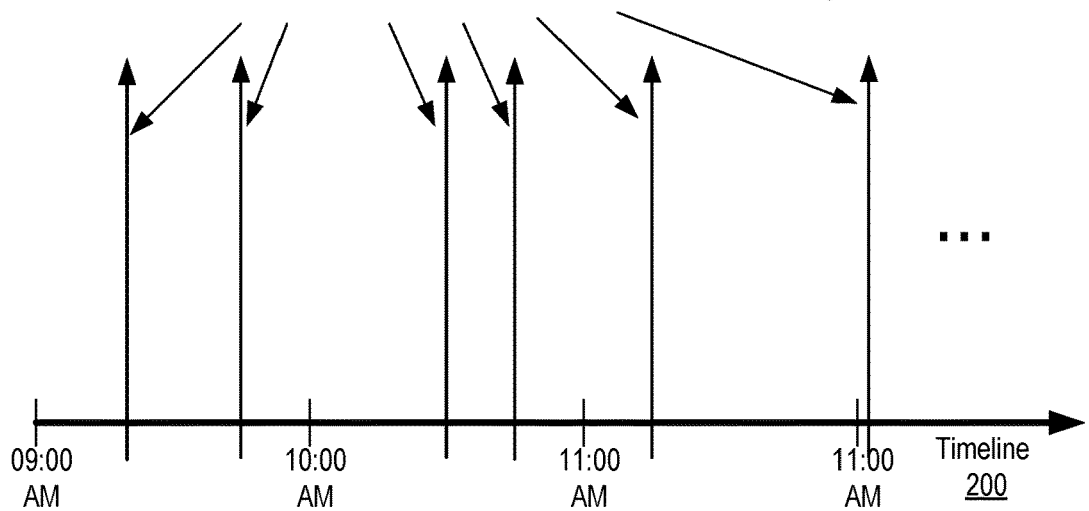
FIG. 2 illustrates an example of differences in temporal distributions of accesses to a resource by non-malicious and malicious entities, according to at least some embodiments.
Figure 2:
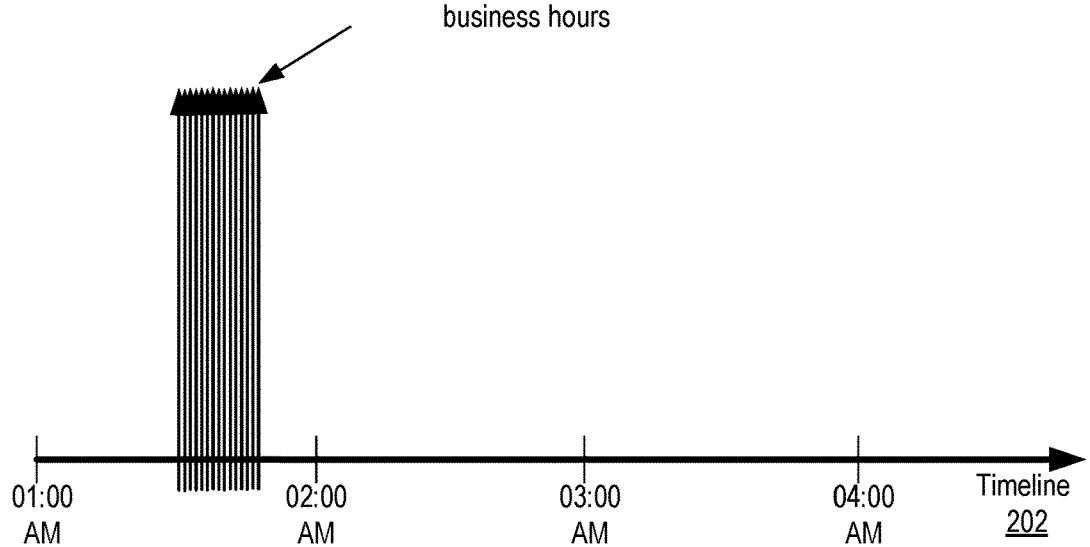

As mentioned above, data about the intervals between successive actions of a given user may be used as one of the dynamic covariates which are used to detect anomalous behavior in some embodiments. One intuition behind the use of such information is that normal or non-malicious users typically tend to access resources in different temporal patterns than malicious users or malicious programs tend to access the same resources. FIG. 2 illustrates an example of differences in temporal distributions of accesses to a resource by non-malicious and malicious entities, according to at least some embodiments. The relative timings of a number of example successive accesses 220 of a resource such as a database of customer information of a web site by a non-malicious user are shown along timeline 200, while the relative timings of example successive accesses 230 of the same resource by a malicious user or program (e.g., a script or bot) are shown along timeline 202.

In the case of the non-malicious user shown using timeline 200, successive accesses are separated from one another minutes or hours. In contrast, the malicious accesses shown along timeline 202 occur very close to each other in time, e.g., with inter-access times of a few milliseconds or even less than a millisecond. In effect, the accesses by the non-malicious user tend to occur at a human scale with respect to timing, while the accesses by the malicious user tend to occur at a speed closer to that of a computer. As such, including the inter-event timing of a user's actions among the signals which potentially indicate anomalous behaviors may be helpful in various embodiments.

Another difference between the two types of user behavior shown in FIG. 2 is that the malicious accesses may occur during non-business hours (e.g., between 1 AM and 2 AM), while the non-malicious accesses may usually occur during business hours. In at least some embodiments, the distribution of accesses within user activity sessions (where the sessions may be defined in various ways, e.g., based on the time of day or based on maximum inter-event durations) may also be taken into account, when deciding whether a collection of events represents anomalous or malicious behavior. For example, aggregation algorithms run by model results aggregators 142 shown in FIG. 1 may take the time of day of a user's accesses into account in one embodiment.

Example User Categories and Associated Event Probabilities

One of the challenges of detecting anomalous or malicious user behaviors is that a given type of user action or action pattern may be perfectly legitimate for some types of users, while being highly unusual for other types of users. For example, while trying to determine potential vulnerabilities or perform causal analysis of a potential data breach, a security analyst may have to access a particular database or resource of an application execution environment in a pattern which would be considered unexpected if performed by an end user. Thus, for the same set of user actions, flagging the security analyst's behavior as anomalous may not be helpful, while flagging the end user's actions as potentially anomalous may be justifiable. In order to take such differences among acceptable user behaviors into account, in at least some embodiments static user attributes such as roles/responsibilities of users may be included in the covariates processed in the machine learning models used for assigning anomaly scores.

Figure 3:
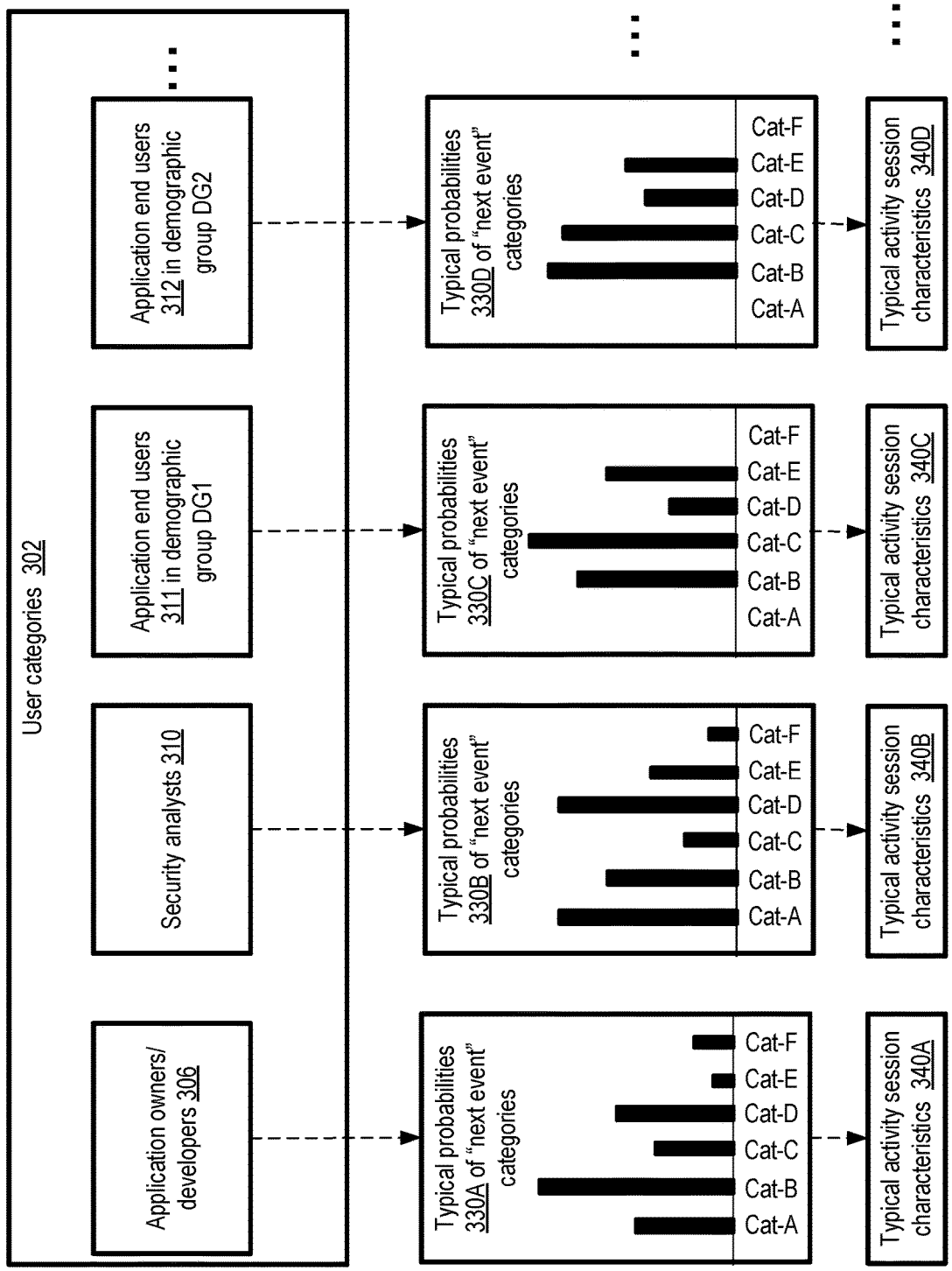
FIG. 3 illustrates example categories of users whose resource access patterns may differ for legitimate reasons, according to at least some embodiments.

FIG. 3 illustrates example categories of users whose resource access patterns may differ for legitimate reasons, according to at least some embodiments. Four example user categories 302 of an application execution environment are shown, including application owners/developers 306, security analysts 310, application end users 311 belonging to a particular demographic group DG1, and application end users 312 belonging to a demographic group DG2. Demographic groups DG1 and DG2 may differ from one another, for example, in the age ranges of the users, their geographical locations, their interests as determined based on accesses to different portions of a web site, how often the users interact with an application execution environment, and so on. The typical probability distributions of six example "next event" categories (Cat-A, Cat-B, Cat-C, Cat-D, Cat-E and Cat-F) are shown for each of the user categories. The event categories may, for example, differ from one another in the type of action (e.g., read, write, copy, upload, . . . ), the type of resource accessed (e.g., databases of respective components of a distributed application, file systems, web pages, etc.), and so on.

As shown in the histogram of typical probabilities 330A, Cat-B events are most likely next events of event sequences for application owners/developers 306, with Cat-D events the next most common. For security analysts, Cat-A and Cat-D events have similar probabilities of being the next events as shown in typical probabilities 330B. For end users of demographic groups DG1 and DG2, Cat-A and Cat-F events have probabilities close to zero as shown in typical probabilities 330C and 330D; Cat-C next events are more likely for DG1 users than for DG2 users. The histograms of next events may be extracted from the event record sources for each user categories in various embodiments, and used to develop respective statistical behavior profiles for each of the user categories. In at least some embodiments, static user attributes available to the analytics service being used for anomaly analysis may include information which can be used to classify end users into demographically similar groups; in other embodiments, such demographic information may not be available, and all the end users of an application execution environment may in effect be considered members of the same demographic group.

In various embodiments, typical activity sessions may be determined for different user categories, and session information may be used in the aggregation phase of anomaly analysis. Session boundaries may be defined, for example, based on a minimum amount of time between successive events of an event sequence, based on login/logout actions, or in other ways in different embodiments. In one implementation, for example, a client of an analytics service may indicate that a user activity session comprises groups of events such that the minimum inter-group duration is 2 hours. Thus, if a user performs 100 actions between 9 am and 11 am on a particular day, then does not perform any other actions until 3 pm, and then performs another 50 actions between 3 pm and 6 pm (each of which were performed less than 2 hours after the previous action), the activities of the user may be mapped to two user activity sessions. The first session would comprise the actions between 9 am and 11 am, and the second session would comprise the actions between 3 pm and 6 pm. In some embodiments, clients may provide definitions of sessions or session boundaries to the analytics service via programmatic interfaces of the service; in other embodiments, typical session boundaries may be determined automatically at the analytics service based on examining the event sequences corresponding to different user categories.

In the embodiment depicted in FIG. 3, typical activity session characteristics 340A, 340B, 340C and 340D may be determined for each user category. Such characteristics may for example indicate the typical lengths of the activity sessions, the number of actions taken per activity session, times of day at which sessions tend to begin and end, and so on. The typical activity session characteristics 340 may be provided as input to the aggregation algorithms which are responsible for determining whether a given user's behavior is anomalous enough to require a response action. The algorithms may, for example, compute the discrepancy between the number of events observed in a particular user session of a given user and the typical number of per-session events for the category to which the given user belongs, and increase the likelihood of designating the given user's activities as requiring an anomaly response if the discrepancy is above a threshold.

Example High-Level Workflow

Figure 4:
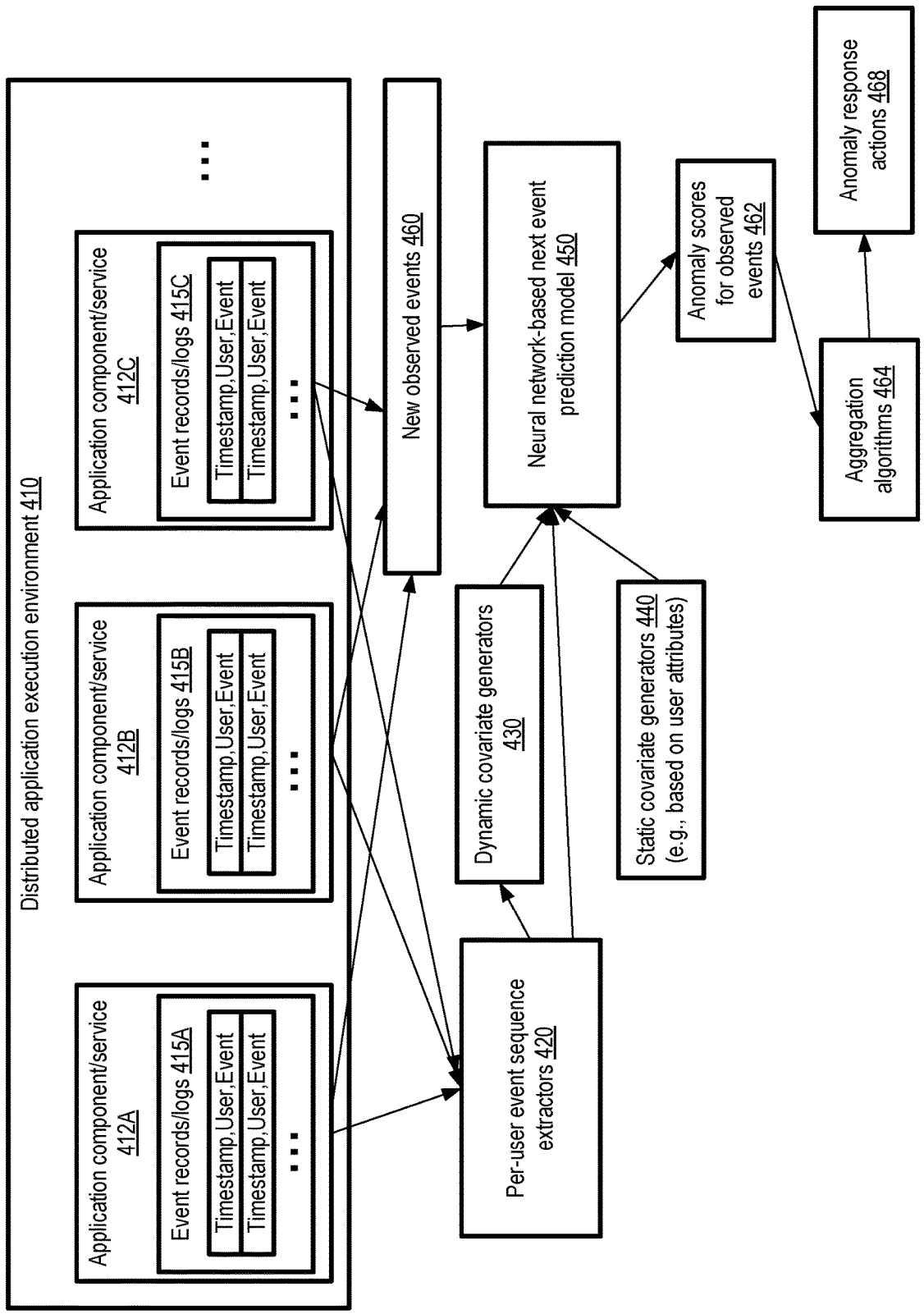
FIG. 4 illustrates an example high-level workflow for detecting anomalies based on event records and associated covariates, according to at least some embodiments.

FIG. 4 illustrates an example high-level workflow for detecting anomalies based on event records and associated covariates, according to at least some embodiments. A distributed application execution environment 410 at which anomaly analysis is to be performed may comprise several different application components or services 412, such as 412A, 412B and 412C. In some cases, a given application component may utilize one or more network-accessible services of a provider network, such as a virtualized computing service, a storage service, a database service or the like. In at least one embodiment, the distributed application may implement a service-oriented architecture, in which different components of the application comprise respective micro-services or constituent services which are developed and deployed relatively independently of each other. In some embodiments, the environment to be analyzed for anomalies may include multiple different applications—e.g., it may include the entire computing infrastructure of an organization, which may be spread across several different premises or data centers. In at least one embodiment, distributed application execution environment 410 may comprise some collection of resources of one or more provider networks, as well as resources located at premises external to the provider network(s).

Individual ones of the application components 412 may include sources of event records or logs in the depicted embodiment, such as event records/logs 415A of application component/service 412A, event records/logs 415B of application component/service 412B, and event records/logs 415C of application component/service 412C. An individual event record or log record may comprise, for example, a timestamp, an indication or identifier of a user who performed or requested an action or event, and an indication or identifier of the action or event in at least some embodiments.

From the distributed collection of event records 415, respective event sequences corresponding to individual users may be obtained, e.g., by per-user event sequence extractors 420 in the depicted embodiment. The per-user event sequence extractors may thus compile comprehensive sequences of event records corresponding to each user, potentially representing the users' interactions with multiple application components or services. Note that the formats of the event records may differ from one application component to another in some embodiments, and the per-user event sequence extractors may normalize or reorganize the records into a common format.

One or more dynamic covariates may be obtained/prepared for individual event records by dynamic covariate generators 430 in the depicted embodiment. Such dynamic covariates may include, for example, an indication of the elapsed time since the previous event of the same per-user event sequence, a representation of the class or category of the user action represented by the event record, representations of resource usage information (e.g., how often the same data store or database whose access is represented by the record was accessed by the same user during a selected recent time interval), information about a type of device or a network address utilized by the user, and so on.

One or more static covariates associated with a given user for which a per-user event sequence has been extracted may be obtained/prepared by static covariate generators 440 in the depicted embodiment. The static covariates may represent user roles/responsibilities, location and other demographic information, and the like. The static and dynamic covariates may be provided as input features during training to a neural network-based next event prediction model 450 in the depicted embodiment, along with representations of the per-user event sequences themselves. Any of a variety of neural network architectures may be used, such as LSTM-based networks, GRU-based networks, CNN-based networks and the like. The output of the model, corresponding to a given input event sequence of a user and associated covariates, may comprise a predicted probability distribution of the next event in the sequence in the depicted embodiment.

After the model has been trained, new observed events 460 (which may also be extracted from event records/logs sources of the application components or services) may be provided as input to the trained version of the model. Based on the discrepancies between the next event predictions generated by the model and the actual events, anomaly scores for observed events 460 may be computed in various embodiments. For example, if an event with a low predicted probability occurs, it may be assigned a higher anomaly score than an event with a high predicted probability. The anomaly scores 462 may be consumed as input by aggregation algorithms 464 (along with other metadata such as session definitions, per-user-category session characteristics, and so on) in the depicted embodiment. The aggregation algorithms 464 in turn may make a determination as to whether an anomaly response action 468 is to be initiated. If such an action is required, the action may be initiated automatically based on the output of the aggregation algorithms 464. The use of aggregation algorithms may help smooth out the response to instances of anomalous behavior in the depicted embodiment, preventing the wastage of resources for response actions undertaken for false positive determinations of malicious behavior, or for anomalous actions that do not necessarily require a response.

Example Neural Network-Based Model

Figure 5:
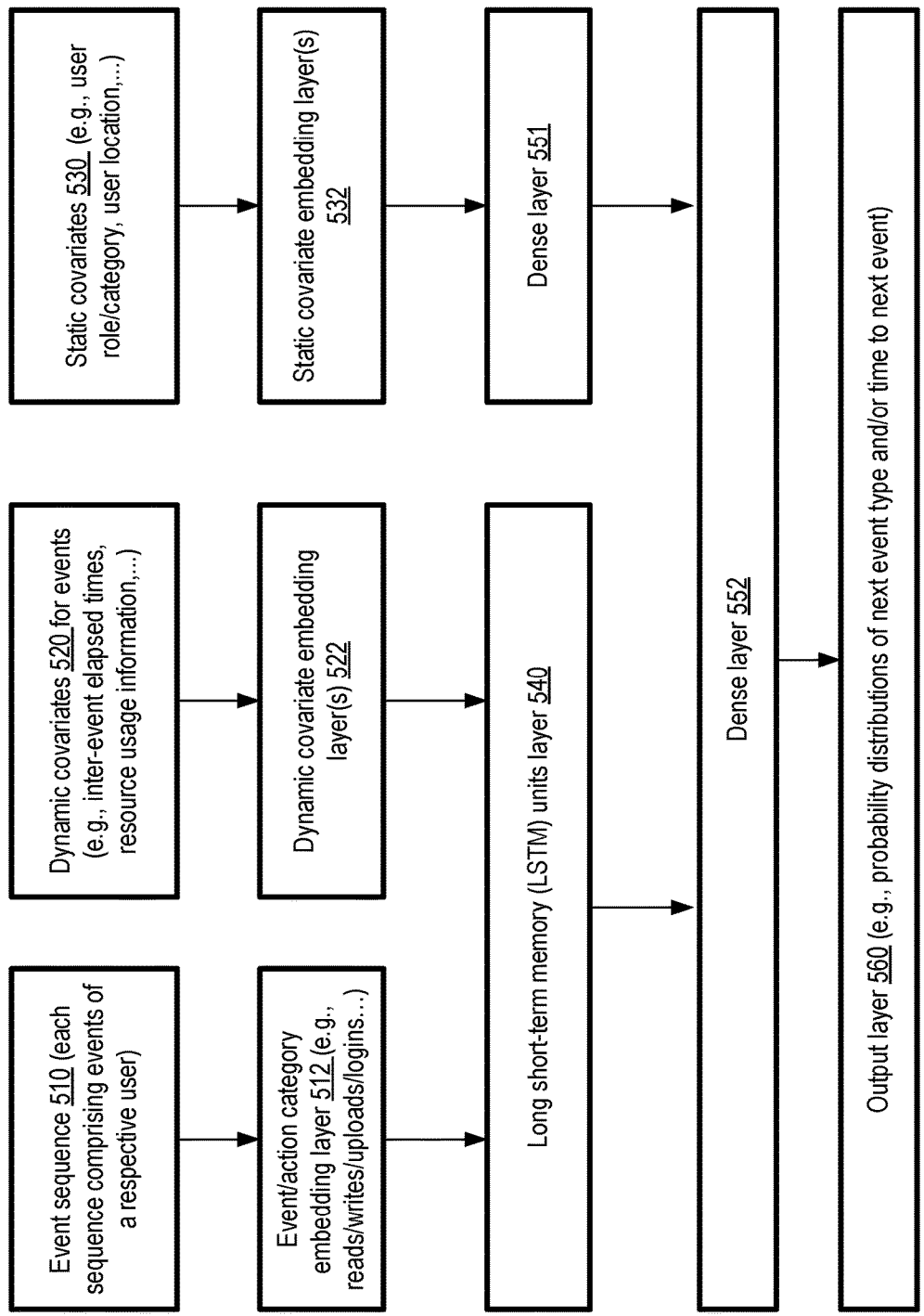
FIG. 5 illustrates an example neural network-based machine learning model which may be used to generate anomaly scores pertaining to actions of application users, according to at least some embodiments.

FIG. 5 illustrates an example neural network-based machine learning model which may be used to generate anomaly scores pertaining to actions of application users, according to at least some embodiments. In the depicted embodiment, the inputs to the model include representations of event sequences 510 (each sequence comprising events associated with a respective user), dynamic covariates 520 (such as inter-event elapsed times, resource usage statistics and the like), and static covariates 530 (such as user role/category information, user location information, etc.). In at least some embodiments, the raw information about the event sequences, dynamic covariates and static covariates may be transformed into the appropriate format for provision as input to the model by feature processing components of an analytics service similar to analytics service 102 of FIG. 1, such as event characterization feature generators 181, static attribute feature generators 182, and dynamic attribute feature generators 183 of FIG. 1.

In the embodiment shown in FIG. 5, respective embeddings (e.g., vector representations within a space of a selected dimensionality, where the dimensionality is a hyper-parameter) may be generated from some or all of the three types of model input. For example, event/action category embedding layer 512 may learn embeddings of the event sequence records, static covariate embedding layers 532 may learn embeddings of the static covariates, and dynamic covariate embedding layers 522 may learn embeddings of the dynamic covariates. Note that in some embodiments, embeddings may not be required for some covariates.

In the example model shown in FIG. 5, the embeddings of the event/action categories and the dynamic covariates are both provided as input to an LSTM (long short-term memory) units layer 540. The embeddings of the static covariates are passed through a first dense neural network layer 551, whose output is then transmitted to another dense layer 552 along with the output from the LSTM units layer 540. The model's output layer 560 may provide predicted probability distributions of the next events of the input event sequences and/or probability distributions of the predicted times to the next event in the depicted embodiment. Such probabilistic predictions may then be compared to new observed events of the event sequences (and/or to the actual times to the new events of the sequences) to assign anomaly scores. For example, consider a scenario in which the predicted probability pf a next event of a category C1 is 5%, and the predicted probability of a next event of category C2 is 25%. If an event of category C1 is the observed next event, a higher anomaly score would be assigned to the observed next event than if an event of category C2 is the observed next event. In another scenario, in which both next event categories and times-to-next-event are predicted by the model, respective weights W1 and W2 may be assigned to the discrepancies with respect to event category and discrepancies with respect to time-to-next-event. As a result, the anomaly score for a particular observed event may be computed by (a) computing a score subcomponent for the category, (b) computing a score subcomponent for the time-to-next-event and (c) combining the two score subcomponents using the respective weights W1 and W2. As mentioned earlier, in some embodiments, other types of neural network-based models, or models that do not rely on neural networks, may be employed to generate predictions of next events and/or times-to-next-events in some embodiments.

Example Programmatic Interactions

Figure 6:
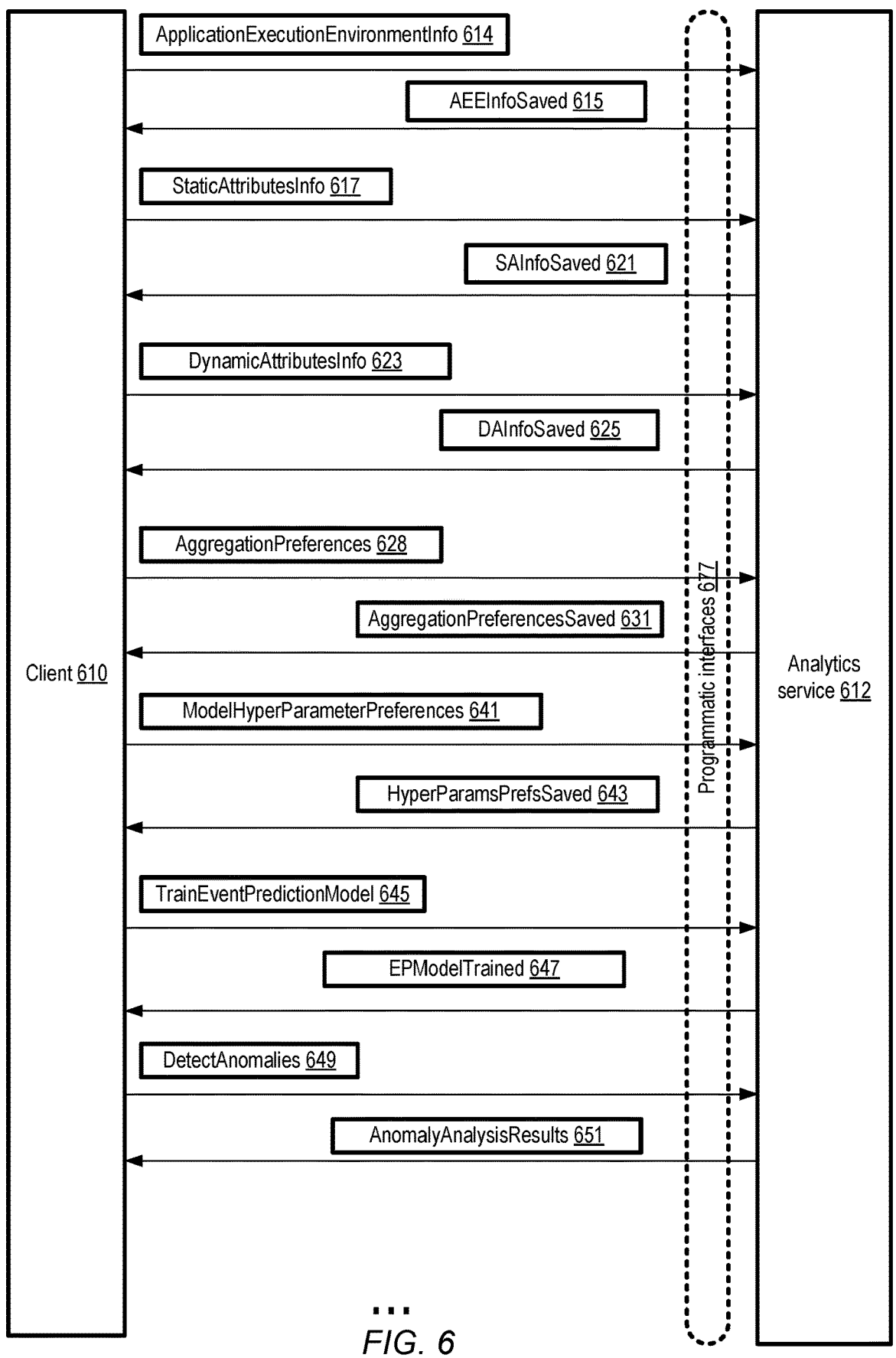
FIG. 6 illustrates example programmatic interactions pertaining to anomaly detection, according to at least some embodiments.

FIG. 6 illustrates example programmatic interactions pertaining to anomaly detection, according to at least some embodiments. An analytics service 612, similar in functionality to analytics service 102 of FIG. 1, may implement a set of programmatic interfaces 677, such as one or more web-based consoles, command-line tools, application programming interfaces, graphical user interfaces and the like. Clients of the analytics service 612 may submit various types of requests via the interfaces 677 and receive corresponding responses from the analytics service via the interfaces in the depicted embodiment.

A client 610 may, for example, use one or more ApplicationExecutionEnvironmentInfo messages 614 to provide information about one or more application execution environments to be monitored for anomalous or malicious user behavior. The information provided may include, for example, descriptors of the computing and storage resources of the application components, indicators of the sources of event records (e.g., logging subsystems of application components), and so on. The provided information may be stored at a repository by the analytics service 612, and an AEEInfoSaved message 615 may be sent to the client as an acknowledgement in some embodiments. The analytics service may utilize this information to extract per-user event sequences in various embodiments.

Clients 610 may provide information about static attributes of the user population whose actions are to be evaluated for anomalies, or sources from which such information can be obtained by the analytics service, e.g., in one or more StaticAttributesInfo messages 617 in the depicted embodiment. The information about static attributes may be stored by the analytics service, and an SAInfoSaved message 621 may be sent to the client. The analytics service may utilize the provided information to generate the static covariates used as input by event prediction model(s).

Similarly, information about the dynamic attributes to be used as input for the model may be indicated in one or more DynamicAttributesInfo messages 623 sent by a client 610 in at least some embodiments. The information may for example define the kinds of dynamic covariates to be used for the model(s), algorithms or programs to be used to derive the dynamic attributes corresponding to individual event records, and so on. After the information about the dynamic attributes is stored at the analytics service, a DAInfoSaved message 625 may be sent to the client in some embodiments.

Guidance regarding the aggregation algorithms to be used to determine whether anomaly response actions are to be performed may be provided by a client 610 via one or more AggregationPreferences messages 628 in the depicted embodiment. In some embodiments, AggregationPreferences messages may include, for example, the rules or programs to be used to aggregate anomaly scores, definitions of sessions or session boundaries if session-based aggregation of anomalous events is to be performed, thresholds to be used to decide whether a given event is to be considered anomalous or not, thresholds to be used to decide whether a collection of anomalous events is to trigger anomaly response, the types of anomaly responses to be initiated, and/or downstream anomaly response initiator programs to which requests to take actions are to be sent. The preferences regarding aggregation may be stored at the analytics service, and an AggregationPreferencesSaved message 631 may be sent to the client in the depicted embodiment.

A client 610 may submit one or more ModelHyperParameterPreferences messages 641 via programmatic interfaces 677 to indicate desired values or value ranges of one or more hyper-parameters of the machine learning models to be used to generate probabilistic predictions of next events of per-user event sequences in the depicted embodiment. Such hyper-parameters may include, for example, the types of machine learning algorithms (e.g., LSTM-based neural networks, GRU-based neural networks, etc.) to be used, details (e.g., number of layers of various types, number of nodes in each layer) of the neural network architecture to be employed in scenarios in which neural networks are used, dimensionality of various input vectors and embedding vectors, loss function, model training completion criteria, and so on. The hyper-parameter preference information may be stored at the analytics service, and one or more HyperParamsPrefsSaved messages 643 may be sent to the client in some embodiments.

To initiate training of the event prediction model or models, one or more TrainEventPredictionModel messages 645 may be sent by a client 610 in the depicted embodiment. The training of a model may be initiated in response to such a request, and an indication that the training is complete and a trained version of the model has been stored may be sent to the client via an EPModelTrained message 647. Note that event prediction models may also be retrained as more event records are collected, e.g., either at some selected time intervals such as once a week or once a month, or in response to new TrainEventPredictionModel messages. In some embodiments, the TrainEventPrediction requests may indicate the time windows over which the input event records are to be collected for training or retraining the model: e.g., whether event records from the last N days or M weeks are to be used while earlier events are to be disregarded.

In some embodiments, a client may submit a DetectAnomalies request 649 to initiate the execution of the trained model for new events detected and recorded at the targeted application execution environments. In response, the latest versions of the trained models may be executed to obtain the anomaly scores corresponding to the new events, and aggregation algorithms may be employed to initiate anomaly response actions based on the model results as discussed earlier. Results of the anomaly analysis for various time periods may be presented to the client via one or more Anomaly AnalysisResults messages 651 in the depicted embodiment. In at least one embodiments, graphical or visualization interfaces may be used to present the results of the anomaly analysis. Information about the total number of events analyzed may be updated dynamically via such visualization interfaces, actionable anomalies may be indicated via special symbols or icons, and easy-to-understand explanations of why the anomalous behaviors were designated as anomalous may be provided to the client in at least some embodiments. Such explanations may, for example, indicate precisely how (in terms of the kinds of actions initiated or resources accessed, the sequence of successive anomalous actions, the timings of the actions, etc.) the user behavior designated as an actionable anomaly differs from the typical behaviors for the category of user involved, for example In some embodiments, anomaly detection may be performed in real time if requested by the client: that is, as soon as a new event is detected, it may be analyzed and its anomaly score may be aggregated with a set of earlier-generated scores for previous events to determine whether an anomaly response is needed. In at least some embodiments, anomaly detection may be performed in batch mode, e.g., in addition to or instead of in real time. In batch mode, for example, a client may request the analysis of H hours or M minutes of collected event records for anomalies.

In at least one embodiment, combinations of programmatic interactions other than those shown in FIG. 6 may be supported for anomaly detection with respect to application execution environments. For example, in some embodiments a client 610 may not necessarily provide guidance about model hyper-parameters; instead, the analytics service may choose the model hyper-parameters on behalf of the client. Similarly, a client may not have to submit a request to begin detecting anomalies in at least one embodiment; instead, as soon as the model is trained, detection of anomalies using the trained version of the model may be initiated automatically. In at least one embodiments, some of the types of programmatic interactions shown in FIG. 6 may not be supported.

Example Provider Network Environment

Figure 7:
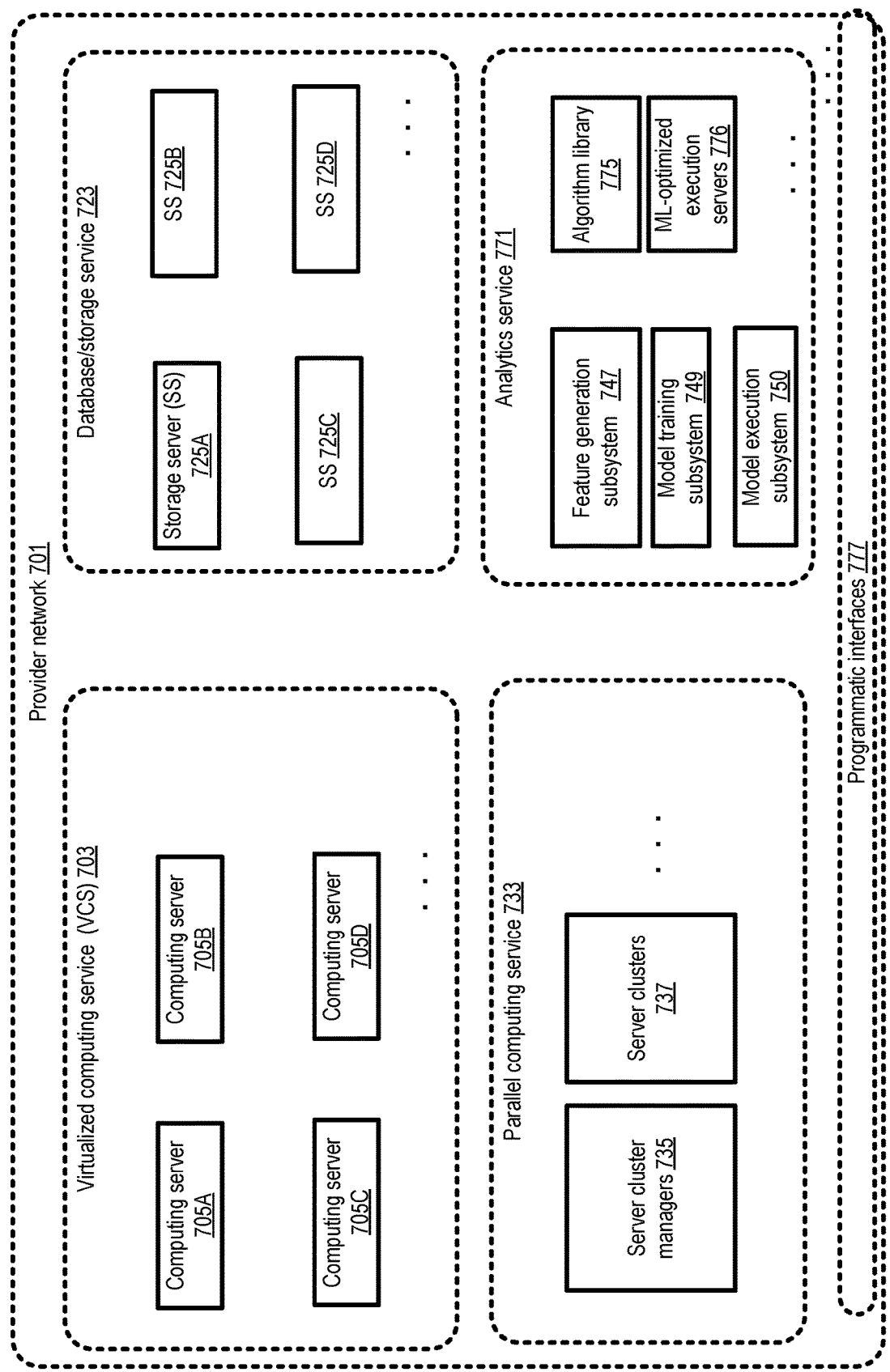
FIG. 7 illustrates an example provider network environment in which an analytics service supporting anomaly detection for application execution environments may be implemented, according to at least some embodiments.

In some embodiments, as mentioned earlier, an analytics service at which anomaly detection and analysis techniques similar to those described above are supported may be implemented at a provider network. FIG. 7 illustrates an example provider network environment in which an analytics service supporting anomaly detection for application execution environments may be implemented, according to at least some embodiments. In the depicted embodiment, provider network 701 may comprise resources used to implement a plurality of services, including for example a virtualized computing service (VCS) 703, a database/storage service 723, and a parallel computing service 733 as well as an analytics service 771 within which anomaly analysis algorithms may be developed and run. The analytics service 771, which may also be referred to as a machine learning service or an artificial intelligence service, in turn may comprise algorithm library 775, a feature generation subsystem 747 (at which features corresponding to event records, static covariates and dynamic covariates similar to those discussed above may be generated), model training subsystem 749 at which various types of event prediction models may be trained and re-trained using algorithms from library 775, model execution subsystem 750 at which the models are executed, and machine learning-optimized execution servers 776 in the depicted embodiment. The parallel computing service 733 may include various server clusters 737, each comprising a plurality of servers, on which parallelizable workloads may be distributed by a set of server cluster managers 735 in the depicted embodiment. Some of the algorithms implemented at the analytics service 771 may be parallelizable, and may utilize the server clusters 737 in at least some embodiments.

Components of a given service may utilize components of other services in the depicted embodiment—e.g., for some analytics service tasks, virtual machines implemented at computing servers such as 705A-705D of the virtualized computing service 703 may be used, server clusters 737 and/or cluster managers 735 may be utilized for parallelizable computations of the analytics service, input data and/or output produced at the analytics service may be stored at storage servers 725 (e.g., 725A-725D) of storage service 723, and so on. In some embodiments, a given application execution environment for which anomaly analysis is performed may utilize resources of one or more of the network-accessible services of provider network 701—e.g., an application execution environment may include some number of virtual machines run at computing servers 705 and some number of storage objects stored at storage servers 725. Each of the services may generate logs of user actions, which may serve as sources for the event records used in the anomaly detection procedures performed using analytics service 771 in such scenarios. Individual ones of the services shown in FIG. 7 may implement a respective set of programmatic interfaces 777 which can be used by external and/or internal clients (where the internal clients may comprise components of other services) in the depicted embodiment.

In some embodiments, at least some aspects of the anomaly analysis techniques described herein may be implemented without acquiring resources of network-accessible services such as those shown in FIG. 7. For example, a standalone tool implemented at one or more computing devices which are not part of a network-accessible service may be used in one embodiment.

Methods for Anomaly Analysis

Figure 8:
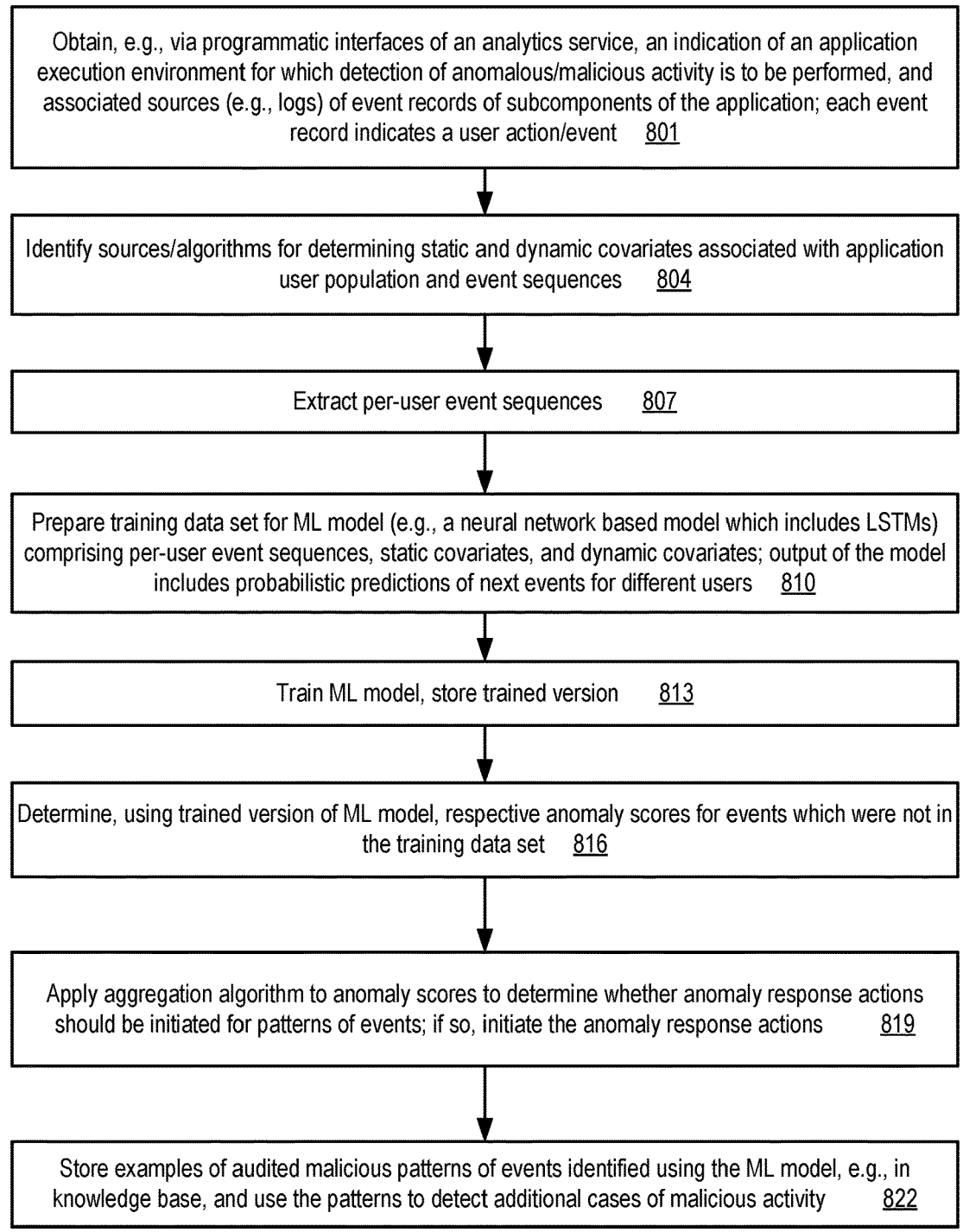
FIG. 8 is a flow diagram illustrating aspects of operations that may be performed to detect and respond to anomalous behavior of application users, according to at least some embodiments.

FIG. 8 is a flow diagram illustrating aspects of operations that may be performed to detect and respond to anomalous behavior of application users, according to at least some embodiments. As shown in element 801, an indication of an application execution environment for which detection of anomalous/malicious activities is to be performed may be obtained, e.g., via programmatic interfaces of an analytics service similar in features and functionality to analytics service 102 of FIG. 1. The information obtained about the application execution environment may enable the identification of a set of sources of event records, such as log files or logging services used at various subcomponents or services used for the applications executed at the environment. Individual event records may indicate an action or event performed or initiated by a user, such as a read operation, a write operation, a data upload or download operation, logins, logouts, and so on. The event records may also include timestamps and provide identification information of the users in various embodiments. Other information may also be contained in at least some event records, such as a network address from which a request for the action/event was submitted by the user, a type of device from which the request was submitted, and so on.

Sources from which static covariates (also referred to as attributes or properties) pertaining to the user population represented in the event records may be identified in the depicted embodiment (element 804). Such sources may include, for example, a user registry or database which contains demographic information, user locations, user roles/responsibilities, user group membership, and so on. These types of user properties or attributes may be referred to as static as they remain unchanged with respect to a given user, at least for relatively long time periods such as weeks or months. In addition, algorithms or techniques to extract dynamic covariates (attributes or properties which typically differ from one event to another event for a given user, or could differ in some cases from one event to another) for individual event records may also be obtained in at least some embodiments. A simple example of dynamic covariates for a given event record is the time difference between the occurrence of the previous event of the same user's sequence of events the occurrence of the event represented in the given event record. Other dynamic covariates for a given event record of a given user may indicate, for example, the category of the event, information about usage of a resource indicated in the given event record (e.g., the number of times the same resource has been accessed by the same user during a selected recent time interval, the number of distinct resources which have been accesses by the same user a selected time interval, etc.) In at least one embodiment, clients of the analytics service, on whose behalf the anomaly analysis is to be performed, may provide information about at least some of the static and/or dynamic covariates to be used via programmatic interfaces of the analytics service. In other embodiments, the analytics service may select at least a subset of static and dynamic covariates without guidance by clients.

From the various event record sources of the application execution environment, each of which may contain records pertaining to numerous users, per-user event sequences may be extracted in various embodiments (element 807). A training data set may be prepared for a machine learning (ML) model whose output comprises probabilistic predictions of the next events expected from various users of the user population (element 810). The training data may include per-user event sequences, associated features representing one or more static covariates for each user, and features representing one or more dynamic covariates for each event record of the event sequences in at least some embodiments. A neural network-based algorithm, e.g., employing LSTM units, may be used for the model in at least some embodiments; other types of models, such as GRU-based neural networks, CNNs or models which do not employ neural networks may be used in other embodiments.

The model may be trained using the training data set, and a trained version of the model may be stored (element 813) in the depicted embodiment. After the model has been trained, it may be employed to generate anomaly scores for events which were not represented in the training data set (element 816)—e.g., higher anomaly scores may be assigned for events whose predicted probability of occurrence is low, and lower anomaly scores may be assigned for events whose predicted probability of occurrence is high.

The raw anomaly scores for a selected set of events of an event sequence may be provided as input to an aggregation algorithm in at least some embodiments (element 819). The aggregation algorithm, which may take into account the total number of events with anomaly scores higher than a threshold during a selected tome interval or during a given user activity session, may be used to make a determination as to whether one or more anomaly response actions should be initiated for the selected set of events.

If a determination is made that an anomaly response action (such as barring further access to an application or data set by a given user, or raising an alarm which triggers further analysis of suspected malicious behavior by a given user) is needed, the action may be initiated automatically in at least some embodiments.

In some embodiments, examples of patterns of anomalous and malicious behavior detected using the machine learning model and the aggregation algorithms may be stored, e.g., in a knowledge base of the analytics service (element 822). Such patterns may later be used to help detect additional cases of malicious activity, e.g., using pattern-matching algorithms applied to per-user event sequences. In some embodiments, the examples may first be audited and verified, e.g., by security experts/analysis, before they are added to the knowledge base. The machine learning models used may be re-trained as more event records become available, and parameters of the aggregation algorithm (such as the time intervals over which the anomaly scores are aggregated, or the definitions of user activity sessions) may be automatically tuned or adjusted over time in at least some embodiments.

Use Cases

The techniques described above, of using machine learning techniques in combination with aggregation algorithms to identify actionable patterns of anomalous user behavior for complex distributed applications may be extremely beneficial in a variety of scenarios. Securing the data and infrastructure of large-scale applications is becoming increasingly important, especially as more and more of the applications are implemented at shared cloud-based environments. Using traditional statistical techniques for detecting security attacks, such as exfiltration or data corruption attempts, often fails to take the context of user actions into account, and can result in large numbers of false positives. Labeled data sets for anomaly detection are difficult to generate in scenarios in which the fraction of anomalous actions is very small. The use of static and dynamic covariates along with per-user event sequences as inputs to the models enables the proposed techniques to in effect determine context-based profiles of acceptable user behavior, which makes the detection of anomalies more effective and efficient.

Illustrative Computer System

Figure 9:
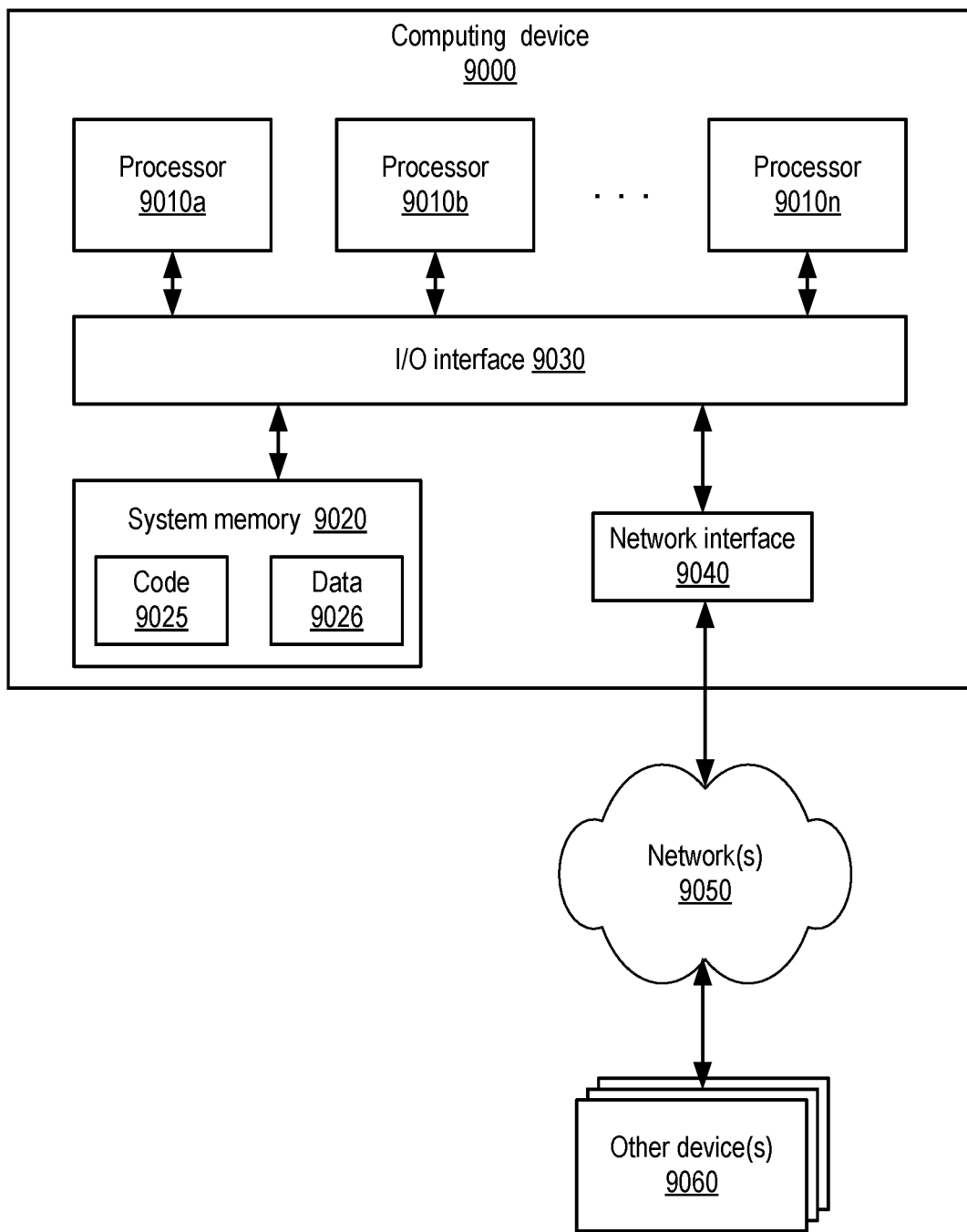
FIG. 9 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 8. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices;
   wherein the one or more computing devices include instructions that upon execution on or across the one or more computing devices cause the one or more computing devices to:
   identify a plurality of sources of event records of an application execution environment, wherein a particular event record provides an indication of (a) a user who took an action that resulted in generation of the particular event record and (b) an event identifier;
   extract, using the plurality of sources, respective event sequences corresponding to individual users of the application execution environment;
   determine, corresponding to individual users corresponding to respective event sequences which have been extracted from the plurality of sources, a respective set of static user attributes, including an indication of a user role with respect to the application execution environment;
   prepare a training data set comprising at least (a) the respective event sequences, (b) the respective sets of static user attributes and (c) one or more dynamic attributes associated with individual events of the respective event sequences, wherein a first dynamic attribute pertaining to a particular event of a particular event sequence indicates an elapsed time between the particular event and a preceding event of the particular event sequence;

train, using the training data set, one or more machine learning models to provide, as output, at least a probabilistic prediction of a next event of an input event sequence corresponding to an individual user of the application execution environment, wherein said training comprises providing at least a portion of the training data set to the one or more machine learning models;

determine, using trained versions of the one or more machine learning models, respective anomaly scores corresponding to a plurality of actions of a first user of the application execution environment, wherein the plurality of actions is not represented in the training data set; and initiate an anomaly response action based at least in part on a result of applying an aggregation algorithm to the respective anomaly scores, wherein the anomaly response action comprises barring further access by the first user.

2. The system as recited in claim 1, wherein a machine learning model of the one or more machine learning models comprises one or more Long Short-Term Memory (LSTM) units.

3. The system as recited in claim 1, wherein a second dynamic attribute pertaining to the particular event of the particular event sequence comprises an indication of resource usage associated with a user action represented by the particular event.

4. The system as recited in claim 1, wherein the one or more computing devices include further instructions that upon execution on or across the one or more computing devices cause the one or more computing devices to:

obtain a user session boundary definition; and utilize, to execute the aggregation algorithm, the user session boundary definition to determine a count of actions of the first user, within a particular session, having anomaly scores which exceed a first threshold, wherein the anomaly response action is based at least in part on a determination that the count exceeds a second threshold.

5. The system as recited in claim 1, wherein the application execution environment comprises respective sets of resources of a plurality of network-accessible services including a first service and a second service, and wherein the plurality of sources include a first log file of the first service and a second log file of the second service.

6. A computer-implemented method, comprising:

preparing a training data set comprising at least (a) a plurality of event sequences representing actions of respective users of an application, (b) respective sets of user properties of the respective users and (c) one or more dynamic attributes associated with individual events of the plurality of event sequences, wherein a first dynamic attribute pertaining to a particular event of a particular event sequence indicates an elapsed time between the particular event and a preceding event of the particular event sequence;

training, using the training data set, one or more machine learning models to provide, as output, at least a probabilistic prediction of a next event of an input event sequence corresponding to an individual user of the application, wherein said training comprises providing at least a portion of the training data set to the one or more machine learning models; and initiating an anomaly response action based at least in part on an analysis of (a) one or more actions of a first user of the application and (b) a set of probabilistic predictions obtained from trained versions of the one or more machine learning models, wherein the anomaly response action comprises barring further access by the first user.

7. The computer-implemented method as recited in claim 6, wherein a first set of user properties of the first user comprises one or more of: (a) a location of the first user, (b) an organizational role of the first user, or (c) a user category to which the first user has been assigned with respect to the application.

8. The computer-implemented method as recited in claim 6, wherein a second dynamic attribute pertaining to the particular event of the particular event sequence comprises an indication of resource usage associated with a user action represented by the particular event.

9. The computer-implemented method as recited in claim 8, wherein the indication of resource usage comprises an indication of one or more of: (a) a number of times that a particular data resource accessed in the user action has been accessed by the first user or (b) a number of resources which have been accessed by the first user.

10. The computer-implemented method as recited in claim 6, further comprising:

determining a plurality of action categories of user actions represented in the plurality of event sequences, including one or more of: (a) read actions, (b) write actions, (c) download actions, (d) upload actions, (e) login actions, or (f) logout actions, wherein a second dynamic attribute pertaining to the particular event of the particular event sequence comprises an indication of an action category of a user action represented by the particular event.

11. The computer-implemented method as recited in claim 6, further comprising:

obtaining, via one or more programmatic interfaces of an analytics service of a provider network, a model training request, wherein the training of the one or more machine learning models is responsive to the model training request.

12. The computer-implemented method as recited in claim 6, wherein the analysis of one or more actions and the set of probabilistic predictions comprises:

determining, using the trained versions of the one or more machine learning models, respective anomaly scores corresponding to a plurality of actions of the first user; and applying an aggregation algorithm to the respective anomaly scores.

13. The computer-implemented method as recited in claim 12, wherein applying the aggregation algorithm comprises determining a number of anomaly scores of the respective anomaly scores which exceeded a threshold within a time interval.

14. The computer-implemented method as recited in claim 12, wherein applying the aggregation algorithm comprises determining a number of consecutive actions of the plurality of actions having anomaly scores which exceeded a threshold.

15. The computer-implemented method as recited in claim 6, wherein the set of probabilistic predictions obtained from trained versions of the one or more machine learning models includes a probabilistic prediction of a timing of an event of an event sequence.

16. One or more non-transitory computer-accessible storage media storing program instructions that when executed on or across one or more processors cause the one or more processors to:
- prepare a training data set comprising at least (a) a plurality of event sequences representing actions of respective users of an application, (b) respective sets of user properties of the respective users and (c) one or more dynamic attributes associated with individual events of the plurality of event sequences, wherein a first dynamic attribute pertaining to a particular event of a particular event sequence indicates an elapsed time between the particular event and a preceding event of the particular event sequence;
- train, using the training data set, a machine learning model to provide, as output, at least a probabilistic prediction of a next event of an input event sequence corresponding to an individual user of the application, wherein said training comprises providing at least a portion of the training data set to the machine learning model; determine, using a trained version of the machine learning model, respective anomaly scores corresponding to a plurality of actions of a first user of the application; and
- initiate an anomaly response action based at least in part on the respective anomaly scores, wherein the anomaly response action comprises barring further access by the first user.

17. The one or more non-transitory computer-accessible storage media as recited in claim 16, wherein a second dynamic attribute pertaining to the particular event comprises an indication of one or more of: (a) a type of device utilized for the particular event or (b) a network address of a device utilized for the particular event.

18. The one or more non-transitory computer-accessible storage media as recited in claim 16, storing further program instructions that when executed on or across the one or more processors further cause the one or more processors to:
- store a representation of a pattern of anomalous user actions, wherein the pattern is detected based at least in part on an comparison of (a) detected actions of a first user and (b) probabilistic predictions obtained using the trained version of the machine learning model; and
- utilize the representation of the pattern to identify additional patterns of anomalous user actions.

19. The one or more non-transitory computer-accessible storage media as recited in claim 16, storing further program instructions that when executed on or across the one or more processors further cause the one or more processors to:
- obtain, via one or more programmatic interfaces, one or more hyper-parameters of the machine learning model.

20. The one or more non-transitory computer-accessible storage media as recited in claim 16, wherein the machine learning model comprises one or more neural networks.

* * * * *